United States Patent [19]

Asaoka

[11] Patent Number: 4,863,579
[45] Date of Patent: Sep. 5, 1989

[54] POWER SUPPLY SYSTEM FOR ELECTROLYTIC PROCESSING APPARATUS

[75] Inventor: Teruo Asaoka, Kakegawa, Japan

[73] Assignee: Shizuoka Seiki Co., Ltd., Shizuoka, Japan

[21] Appl. No.: 137,461

[22] Filed: Dec. 23, 1987

[30] Foreign Application Priority Data

Dec. 27, 1986 [JP] Japan .................................. 61-309269
Jul. 8, 1987 [JP] Japan .................................. 62-170749

[51] Int. Cl.⁴ .......................... B23H 1/02; B23H 3/02; B23H 7/14
[52] U.S. Cl. ................................ 204/224 M; 204/228; 204/DIG. 9; 219/69.18; 219/69.13
[58] Field of Search ............ 204/DIG. 9, 224 M, 228, 204/129.43, 69 C, 69 P

[56] References Cited

U.S. PATENT DOCUMENTS

| | | | |
|---|---|---|---|
| 3,485,987 | 12/1969 | Porterfield | 219/69 P |
| 3,485,988 | 12/1969 | Sennowitz | 219/69 P |
| 3,536,881 | 10/1970 | Inoue | 204/228 X |
| 3,596,038 | 7/1971 | Hockenberry | 219/69 P |
| 3,607,689 | 9/1971 | Inoue | 204/224 M X |
| 3,650,940 | 3/1972 | Bardahl | 204/224 M X |
| 4,659,894 | 4/1987 | Inoue | 204/224 M X |
| 4,681,997 | 7/1987 | Inoue et al. | 219/69 P X |

FOREIGN PATENT DOCUMENTS

| | | |
|---|---|---|
| 60-3532 | 1/1985 | Japan . |
| 60-44228 | 3/1985 | Japan . |
| 60-177819 | 9/1985 | Japan . |
| 60-59097 | 12/1985 | Japan . |
| 61-38819 | 2/1986 | Japan . |
| 61-71921 | 4/1986 | Japan . |

Primary Examiner—Donald R. Valentine
Attorney, Agent, or Firm—Flynn, Theil, Boutell & Tanis

[57] ABSTRACT

A power supply system for an electrolytic processing apparatus which uses a discharge of pulses between a work and electrode including a discharge section having plural capacitors, rectifiers connected the capacitors so as to prevent reversing of current to the power source side, a plurality of discharge switches having an on-off function and connected to said capacitors, and a control section for turning the discharge switches on and off so as to control the discharge of charges from the capacitors to the work and electrode. A power supply section supplies a predetermined electric power for the capacitors, and a charging section selectively transfers power from the power supply section so as to charge the capacitors in a desired manner.

17 Claims, 9 Drawing Sheets

POWER SUPPLY SYSTEM FOR ELECTROLYTIC PROCESSING APPARATUS

FIELD OF THE INVENTION

The present invention relates to a power supply system for an electrolytic processing apparatus and, more particularity, to a power supply system for an electrolytic processing apparatus which is capable of suitably controlling and maintaining electric charges discharged between an electrode and a work which oppose each other across a processing liquid while reducing noise generated in the power supply side so as to diminish any unfavorable effect which might otherwise be caused on the surrounding environment, and to a power supply system capable of supplying pulses of different current densities so as to finish a three-dimensional work surface in a short time and with a high degree of precision, thereby producing a mirror-finished lustre surface.

BACKGROUND OF THE INVENTION

There are two types of electroprocessing system for electrically processing metals, namely an electrolytic processing apparatus and an electric discharge processing machine. The first-mentioned apparatus (the electrolytic processing apparatus) employs an electrolyte such as sodium nitrate and sodium chloride, which fills the gap between a work and an electrode. In operation, the electrolyte is circulated at a high speed and D.C. current is made to flow from the work to the electrode while a suitable measure is taken for removing electrolytic products which impair the stability of the electrolysis, for example eluated intermetallic compounds, metal ions and hydrogen gas. This type of electrolytic processing apparatus is shown, for example, in Japanese patent laid-open No. 71921/1986 and Japanese patent laid-open No. 44228/1985.

The second-mentioned type of apparatus (the electric discharge processing apparatus), employs a bath of a processing liquid such as water, kerosene and the like in which a work is disposed to oppose an electrode with a small gap therebetween. In operation, the work and the electrode are connected to each other so as to cause a momentary sparking discharge or a transient arc between the work and the electrode, thereby processing the work by the energy of the discharge. This type of processing apparatus is shown, for example, in Japanese patent publication No. 26646/1985 and Japanese patent laid-open No. 177819/1985.

Figure 9:
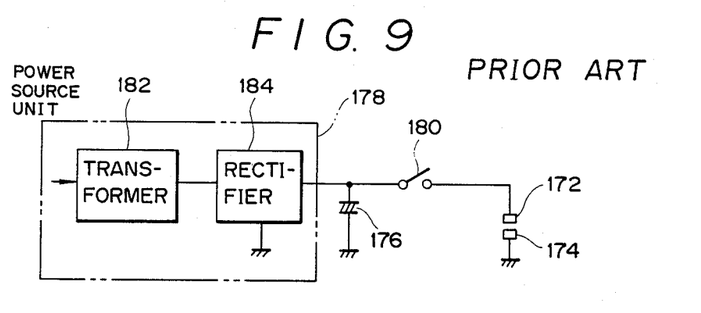
FIG. 9 is a schematic diagram of a conventional power supply system.

An example of this power supply system is shown in FIG. 9. This power supply system has a power source unit 178 connected to a capacitor 176 which is adapted to cause an electric discharge between an electrode 174 and a work 172. The capacitor 176 is connected at its one end to the work 172 through a discharge switch 180 and at its other end to the electrode 174 through grounding. The power supply unit 178 has a transformer 182 and a rectifier 184. A.C. power is transformed to a lower voltage by the transformer 182 and is rectified by the rectifier 184, and the resulting D.C. power is used to charge up the capacitor 176. As the discharge switch 180 is closed, an electric discharge is caused between the work 172 and the electrode 174 so as to machine or process the work 172.

Power supply systems are also known in which, as disclosed in Japanese patent laid-open No. 3532/1985, an auxiliary capacitor is provided so as to enable the charging voltage to be varied, as well as an apparatus in which, as disclosed in Japanese patent laid-open No. 59097/1985, a second capacitor is provided to control the charging voltage at a constant level. Japanese patent laid-open No. 38819/1986 discloses a plurality of capacitors of different capacitances for selective use so as to provide different discharge voltages.

All of these known power supply systems suffer from a common problem in that, since the processing is conducted by electric discharge from a single capacitor at a time, a large noise pulse is generated in the power supply side when a large discharge current is produced, thus adversely affecting the surrounding environment.

In order to control the quantity of charges discharged between the work and the electrode, it is necessary to impart a voltage drop characteristic to the discharge switch or to connect a resistance in series to the discharge switch. In consequence, however, power is consumed wastefully.

The state of the surface of the work processed by an electrolytic processing apparatus depends on various factors such as current density, work gap and density of the processing liquid. When one of these factors is insufficient, for example when the current density has come down below a predetermined level, the processing precision is impaired, so that the desired degree of luster is not achieved. Hitherto, various measures have been taken for the purpose of ensuring a sufficiently large margin of the processing conditions so as to obtain a quantity of the electrostatic charge large enough to conduct the processing. For instance, it has been proposed to set the charging voltage at a level higher than a predetermined level. It has also been proposed to reduce the length of time over which the discharge is conducted A setting of the charging voltage at a high level, however, causes the electric current density to increase to an impractically high level at the peak of the discharge current. On the other hand, the reduced time length of the discharge increases the number of discharging cycles needed for a given amount of processing, with the result that the processing time is increased undesirably.

The known electrolytic processing apparatus in general suffers from the following vital defect. Namely, it is impossible to obtain a uniform flow velocity of the electrolyte through the gap between the electrode and the work when the work has a complicated shape, such as a three-dimensional recess with a bottom. In addition, different levels of concentration of electrolytic products are developed between the inlet and outlet side, even when a large pressure of the electrolyte is applied to the discharge gap. This means that different portions of the discharge gap produce different processing conditions, even if the discharge current is developed uniformly over the whole area of the gap. In consequence, it becomes difficult to precisely transfer the electrode to the work and, hence, difficult to obtain a high precision of the processed work surface.

On the other hand, the known electric discharge processing systems in general exhibit a comparatively high level of efficiency in the range of fineness of the work surface in terms of roughness (Rmax) of up to 20 $\mu$m. For attaining a higher degree of surface fineness, it is necessary to employ a very small processing current of less than 1 A. In consequence, the processing time is impractically long, particularly when the work has a large surface to be processed. When the area of the processed surface is large, the electrostatic capacitance between the work surface and the electrode is increased, so that it becomes difficult to delicately control the discharge current, with the result that the desired level of surface fineness is not achieved.

In ordinary discharge processing using an insulating oil, the processed surface usually has a hardened surface layer which is minutely cracked to a large depth. On the other hand, wire discharge processing making use of pure water generates a softened layer. Both types of electric discharge processing, therefore, cannot provide the desired quality of the surface. When the product surface is required to have a high degree of precision or extended life, lapping and other surface polishing operation is conducted. Thus, much time and labor are required for finishing the surface after the electric discharge processing.

Accordingly, an object of the present invention is to provide a power supply system for an electrolytic processing apparatus which is capable of suitably controlling and maintaining electric charges discharged between an electrode and a work which oppose each other across a processing liquid, while reducing noise generated in the power supply side so as to diminish any unfavorable effect which may otherwise be caused on the surrounding environment.

Another object of the present invention is to provide a power supply system of an electrolytic processing apparatus which is capable of controlling the amount of charges discharged between a work and an electrode so as to finish a complicated work surface (such as a three-dimensional shape) in a short time and with a high degree of precision.

SUMMARY OF THE INVENTION

According to the invention, there is provided a power supply system for an electrolytic processing apparatus of the type having an electrode which is positioned to oppose a work within an electrolyte such that the work is processed and finished by discharge of pulses between the work and the electrode, the power supply system including: a discharge section having a plurality of capacitors connected in parallel and adapted for discharging charges to the gap between the work and the electrode which face each other across the electrolyte, rectifiers connected to the capacitors so as to prevent reversing of current to the power supply side, and discharge switches connected to the capacitors and adapted to be opened and closed so as to selectively enable the capacitors to discharge the charges; a power supply section for supplying predetermined electric power to the capacitors; a charging section for selectively transferring the power from the power supply section so as to charge the capacitors in a desired manner; and a control section for opening and closing the discharge switches to thereby control the discharge of charges from the capacitors.

According to the invention, there is also provided a power supply system for an electrolytic processing apparatus of the type having an electrode which is positioned to oppose a work within an electrolyte such that the work is processed and finished by a discharge of pulses between the work and the electrode, including: a discharge section having capacitors capable of discharging charges across the work and the electrode, rectifiers connected to the capacitors and adapted for preventing reversing of charges to the power source side, and a plurality of parallel discharge switches having an on-off function and connected to the capacitors; and a control section for turning the discharge switches on and off so as to control the discharge of charges from the capacitors.

According to the invention, the discharge switches are controlled by the control section in such a manner that, for example, a plurality of capacitors are selectively allowed to discharge and the discharge from the capacitors can be stopped when a predetermined condition is met, for example when the discharge current has come down below the minimum electric current. In addition, the value of the charging current for charging up the capacitors is limited to a value necessary for charging up these capacitors, even when the required amount of charges (the discharge current) from each capacitor is increased, so that the noise generated in the power supply side can be reduced advantageously.

In another form of the invention, a plurality of capacitors are selectively allowed to discharge as the discharge switches are suitably turned on and off by the control section. When a specific condition is met, for example when the discharge current value has come down below a predetermined minimum current value, the discharge from the capacitors is stopped. It is thus possible to precisely control the discharge of charges from the capacitors so as to maintain a high level of current density of the processing pulses.

BRIEF DESCRIPTION OF THE DRAWINGS

Several embodiments of the invention will be described in detail hereinafter with reference to the drawings, in which.

DETAILED DESCRIPTION

FIGS. 1-3 AND 6-8 show a first embodiment of the present invention. As will be seen from FIG. 1, a power supply unit 2 of the invention has a discharge section 4, a charging section 6, a power source unit 8 and a control section 10.

Figure 1:
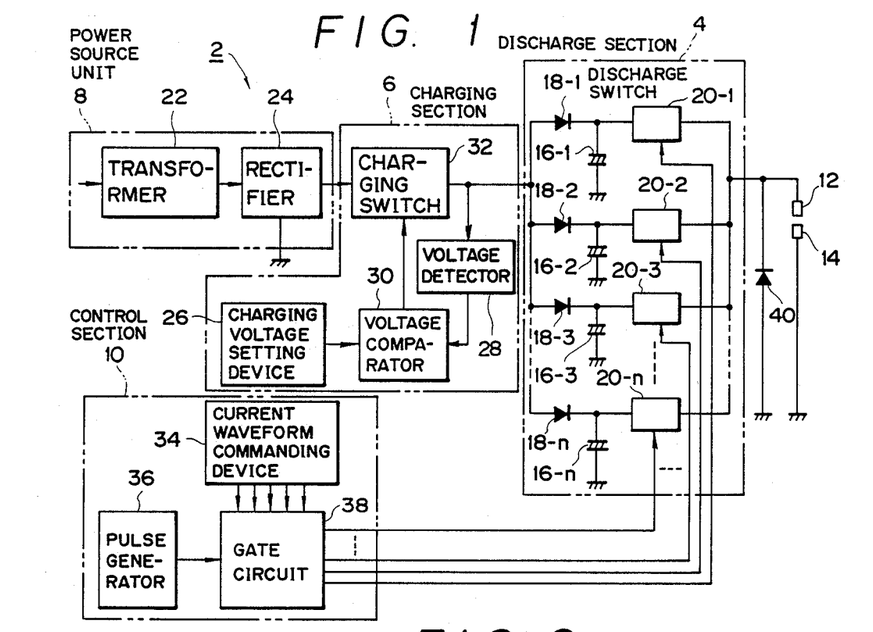
FIG. 1 is a schematic diagram of a power supply system embodying the present invention.

The discharge unit 4 has a plurality of capacitors 16-1 to 16-$n$ connected essentially in parallel between a workpiece 12 and an electrode 14 which are arranged to oppose each other across a processing liquid. To the capacitors 16-1 to 16-$n$ are connected rectifiers 18-1 to 18-$n$ for preventing electric currents from reversing to the power source side and discharge switches 20-1 to 20-$n$ for allowing the charges in the respective capacitors to be discharged. The power source unit 8 is constituted by a transformer 22 and a rectifier 24. A reduced voltage obtained through the transformer 22 is rectified by the rectifier 24 so as to become a D.C. current which is supplied to the capacitors 16-1 to 16-$n$.

The charging section 6 has a charging voltage commanding device 26 for setting the command levels of voltages for charging up the capacitors 16-1 to 16-$n$, a voltage detector 28 for detecting the charging voltage supplied to the capacitors 16-1 to 16-$n$, a voltage comparator for conducting comparison between the command charging voltage and the charging voltage detected by the voltage detector 28, and a charging switch 32 for charging the capacitors 16-1 to 16-$n$ in accordance with the signal from the voltage comparator 30.

The control section 10 has a waveform commanding device 34 for setting a command of waveform of discharge current between the electrode 14 and the work 12 which face each other across the processing liquid, a pulse generator 36 for generating pulses having a predetermined pulse width or duration, and a gate circuit 38 which produces signals for selectively opening and closing the discharge switches 20-1 to 20-$n$ in accordance with the outputs from the waveform commanding device 34 and the pulse generator 36, thereby allowing charges to be transferred from selected capacitors to the discharge side.

Figure 3:
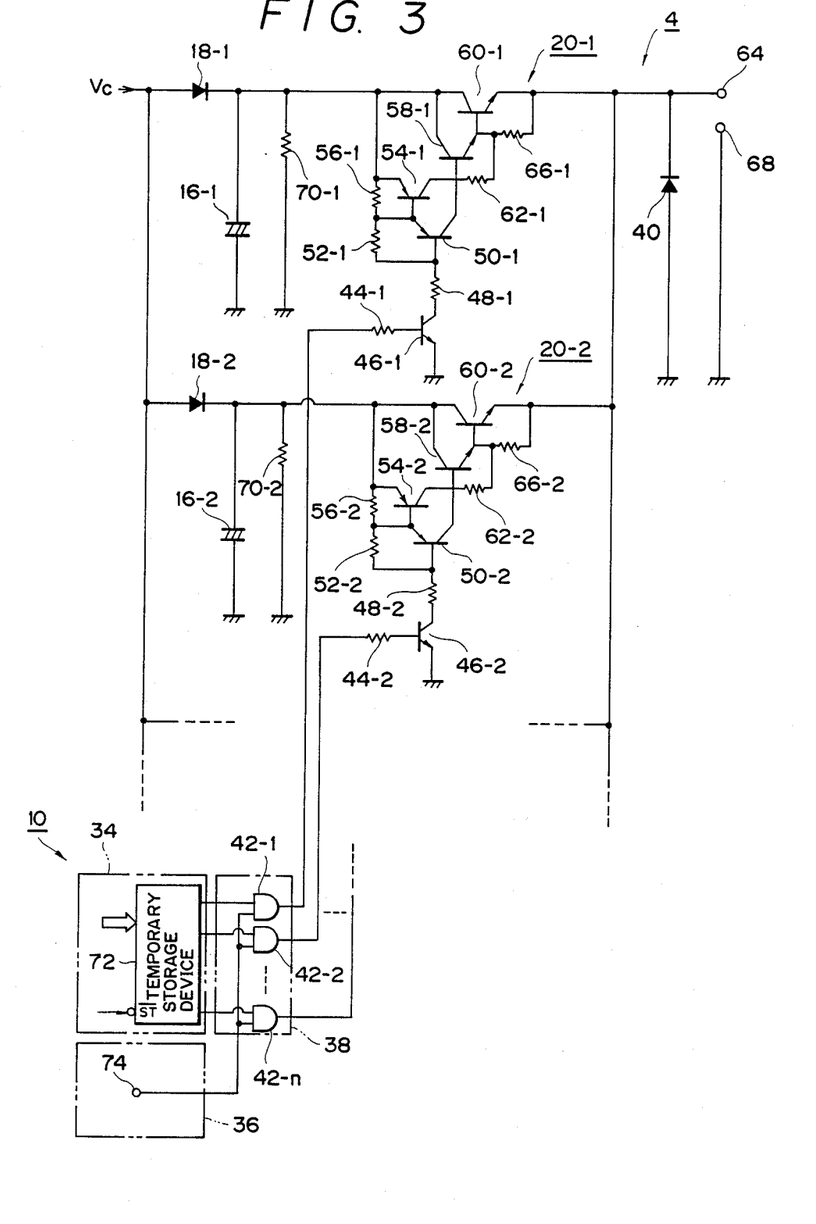
FIG. 3 is a schematic circuit diagram of a discharging section and a control section which are portions of the power supply of FIG. 1.

A reference numeral 40 denotes a rectifier for preventing the discharge switches 20-1 to 20-$n$ from being broken down by a back electromotive force which is produced when each of the discharge switches 20-1 to 20-$n$ is opened. As shown in FIG. 3, the discharge section 4 includes rectifiers 18-1 to 18-$n$ which prevent backward flow of electric current and are connected to the source side of the capacitors 16-1 to 16-$n$, and discharge switches 20-1 to 20-$n$ connected to the discharge sides of these switches. Each of the discharge switches 20-1 to 20-$n$ provides a connection between each AND gate 42-1 to 42-$n$ in the gate circuit 38 of the control section 10 to the base of each transistor 46-1 to 46-$n$ by means of respective one of resistors 44-1 to 44-$n$. Each of the transistors 46-1 to 46-$n$ has an emitter which is grounded and a collector which is connected through a respective resistor 48-1 to 48-$n$ to the base of a respective transistor 50-1 to 50-$n$. The base and the emitter of each of the transistors 50-1 to 50-$n$ are connected to each other through a respective one of resistors 52-1 to 52-$n$. The emitter of each of the transistors 50-1 to 50-$n$ is connected to the base of a respective one of transistors 54-1 to 54-$n$. The base and the emitter of each of the transistors 54-1 to 54-$n$ are connected to each other through a respective one of the resistors 56-1 to 56-$n$. The transistors 54-1 to 54-$n$ are connected at their emitters to the discharge sides of the respective capacitors 16-1 to 16-$n$.

The bases of the transistors 50-1 to 50-$n$, as well as the bases of the transistors 54-1 to 54-$n$, are connected to the bases of the transistors 58-1 to 58-$n$, respectively. The transistors 58-1 to 58-$n$ have collectors connected to the discharge sides of the respective capacitors 16-1 to 16-$n$ and emitters connected to the bases of the respective transistors 60-1 to 60-$n$. The emitter and the base of each of the transistors 60-1 to 60-$n$ are connected to each other through a respective one of resistors 62-1 to 62-$n$. The collectors of the transistors 60-1 to 60-$n$ are connected to the discharge sides of the respective capacitors 16-1 to 16-$n$, while the emitters of same are connected to a work terminal 64. The emitter is connected to the base of each of the transistors 60-1 to 60-$n$ by a respective resistor 66-1 to 66-$n$. The discharge switches 20-1 to 20-$n$ are adapted to operate in accordance with opening and closing driving signals from the gate circuit 38 so as to successively actuate the transistors 42-1 to 42-$n$ through 60-1 to 60-$n$, thereby allowing the capacitors 16-1 to 16-$n$ to discharge. Reference numeral 68 denotes an electrode terminal, and 70-1 to 70-$n$ denote resistors connected in parallel to the capacitors 16-1 to 16-$n$.

As will be understood from FIG. 3, the control section 10 is arranged to connect a temporary storage device 72 in the waveform commanding device 34, as well as the output terminal 74 of the pulse generator 36, to the AND gates 42-1 to 42-$n$ of the gate circuit 38. Upon receipt of both an output from the temporary storage device 72 of the waveform setting device 34 and an output from the output terminal 74 of the pulse generator 36, each of the AND gates 42-1 to 42-$n$ of the gate circuit 38 operates to enable the transistors 46-1 to 46-$n$ through 60-1 to 60-$n$ of the discharge switches 20-1 to 20-$n$, thereby causing the capacitors 16-1 to 16-$n$ to discharge.

Figure 2:
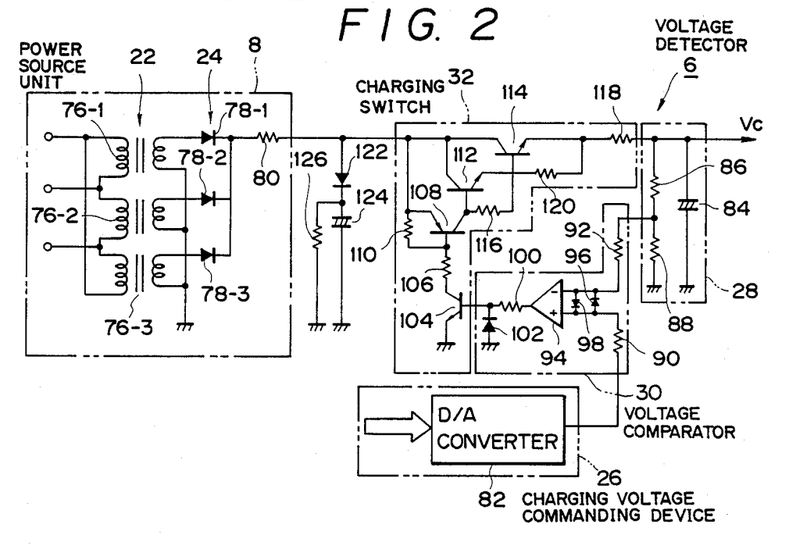
FIG. 2 is a schematic circuit diagram of a power supply section and a charging section which are portions of the power supply of FIG. 1.

As shown in FIG. 2, the power supply unit 8 transforms each of three phases into a lower voltage by means of the coil 76-1 to 76-3, and each phase of the current of the reduced voltage is rectified by a respective one of the rectifiers 78-1 to 78-3. The D.C. output from these rectifiers is output through a resistor 80.

The construction of the charging section will be explained with reference to FIG. 2. The charging voltage commanding device 26 has a D/A converter 82 through which a signal indicating the commanding charging voltage is transmitted. The voltage detector 28 has a capacitor 84, one end of which is grounded, and has a series connection of a pair of resistors 86 and 88 which is connected in parallel with the capacitor 84. The divided potential or voltage divided by the series connection of resistors 86 and 88 is output as the charging voltage value. The output of the charging voltage commanding device 26 and the output of the voltage detector 28 are connected through resistors 90 and 92, respectively, to inputs of a comparator 94 of a voltage comparator 30. Rectifiers 96 and 98 are connected between the inputs of the comparator 94. A resistor 100 is connected to the output of the comparator 94. A rectifier 102 has one end grounded and its other end connected to the resistor 100, and also connected to the base of the transistor 104 of the charging switch 32.

The charging switch 32 provides, through a resistor 106, a connection between the base of the transistor 108 and the collector of the transistor 104, the emitter of which is grounded. The emitter and the base of the transistor 108 are connected to each other through a resistor 110. The emitter of the transistor 108 also is connected to the output side of the power supply unit 8. The collector of the transistor 108 is connected to the base of the transistor 112. The transistor 112 has a collector which is connected to the output side of the power supply unit 8, and has an emitter connected to the base of the transistor 114. The emitter and the base of transistor 112 are connected to each other through a resistor 116. The transistor 114 has a collector connected to the output side of the power supply unit 8 and an emitter connected through a resistor 118 to the voltage detector 28. The emitter and the base of the transistor 114 are connected to each other through a resistor 120. A rectifier 122 for protecting the charging switch 32 has one end connected to the juncture between the power supply unit 8 and the charging switch 32 and has its other end grounded through a capacitor 124 and a resistor 126. The charging section 6 is adapted to turn on and off the transistors 104 to 114 of the respective charging switches in accordance with the output of the voltage comparator 30, which compares the command charging voltage specified by the charging voltage commanding device 26 to the charging voltage detected by the voltage detector 28. In consequence, the supply of the power from the power supply unit B is selectively cut off, thereby charging the capacitors 16-1 to 16-$n$ up to the desired voltage.

The charging voltage commanding device 26 of the charging section 6 and the current waveform commanding device 34 and the pulse generator of the control section 10 are connected to a microcomputer 128 (FIG. 6) which serves as an arithmetic processing device so that the memory device and the computing capacity of the microcomputer are utilized.

The operation of this first embodiment will be described hereinunder.

The power supply system 2 having the described construction can be used as the power supply for various types of processing apparatus. One typical example of such apparatus is an electrolytic processing apparatus in which the charges from the capacitors are discharged across a gap between a work 12 and an electrode 14 which face each other through an electrolyte, so that the work 12 is electrolytically eluted so as to be processed. Another typical example is an electric discharge processing apparatus in which the charges from the capacitors 16 are discharged across the gap between a work and an electrode which oppose each other through a processing liquid, so that the work is melted and evaporated.

In the use of the power supply system in one such apparatus, a charging voltage is set for the capacitors 16-1 to 16-$n$ by means of the charging voltage commanding device 26. At the same time, waveforms are set by the waveform commanding device 34, taking into account various factors such as the area over which the work 12 and the electrode 14 oppose each other, the gap between the electrode 14 and work 12, the density of the processing liquid, the duration of the discharge, and so forth.

The D.C. voltage of a predetermined magnitude obtained through the transformer 22 and the rectifier 24 of the power source unit 8 is supplied to the capacitors 16-1 to 16-$n$. The charging section 6 detects the charging voltage of the capacitors 16-1 to 16-$n$ by means of the voltage detector 28, and the thus detected charging voltage is compared by a voltage comparator 30 with the command voltage set by the charging voltage commanding device 26. When the detected charging voltage is below the command charging voltage, the transistors 104 to 114 of the charging switch 32 are turned on so that electricity is supplied from the power source unit to charge up the capacitors 16-1 to 16-$n$. When the detected charging voltage is higher than the command charging voltage, the transistors 104 to 114 of the charging switch 32 are turned off so as to cut-off the power from the power supply unit 8, whereby the charging of the capacitors 16-1 to 16-$n$ is completed.

The discharge from the capacitors 16-1 to 16-$n$ controlled by the control section 10. The control section 10 operates such that the output from the temporary storage device 72 of the waveform commanding device 34 and the output from the pulse generator 36 are received by the AND gates 42-1 to 42-$n$ of the gate circuit 38. Upon receipt of the outputs from the waveform commanding device 34 and the pulse generator 36, the AND gates 42-to 42-$n$ operate so that the transistors 46-1 to 46-$n$ of the discharge switches 20-to 20-$n$ are selectively turned on, whereby the capacitors 16-1 to 16-$n$ discharge selectively.

This in turn causes the charges to be discharged across the gap between the work 12 and the electrode 14 through the processing liquid, whereby the work 12 is processed by electrolytic elution, or by melting and evaporation.

Figure 7A:
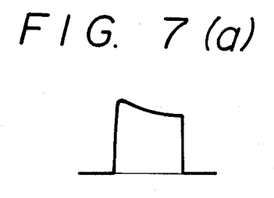
FIGS. 7(a), 7(b) and 7(c) are waveform charts showing respective discharge current.
Figure 7B:
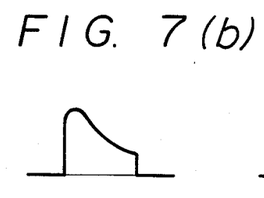
Figure 7C:
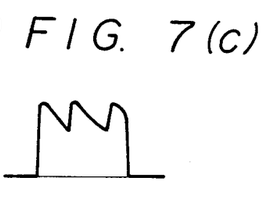

The control section 10 is adapted to deliver opening/closing driving signals to the selected discharge switches 20-1 to 20-$n$ in accordance with the signal input to the gate circuit 38 from the waveform commanding device 34 and the pulse generator 36. The control section 10 also is capable of changing the waveform command set in the waveform commanding device 34 even during discharging. It is therefore possible to discharge the charges of the capacitors 16-1 to 16-$n$ in any desired waveform, as shown in FIGS. 7($a$), 7($b$) and 7($c$), whereby the amount of charge discharged can be varied freely and easily.

The charging voltage commanding device 26, current waveform commanding device 34 and pulse generator 36 are preferably controlled by a conventional microprocessor, the temporary storage device 72 being a conventional latch. While causing the pulse generator 36 to produce one pulse, the number of binary "1" bits loaded into the storage device 72 can be varied, thereby varying how many discharge switches are actuated in order to vary the number of capacitors being discharged and thus the amount of current flowing to the work 12 at each given point in time. In this manner, the waveforms in FIGS. 7($a$), 7($b$) and 7($c$) can be easily achieved.

Since rectifiers 18-1 to 18-$n$, which prevent reversing of current to the power source side, are connected to the power source sides of the respective capacitors 16-1 to 16-$n$, there is no risk for the electric current to rush back into a specific capacitor even when the capacitors 16-1 to 16-$n$ have different voltages. In consequence, it is possible to avoid the concentration of load to a specific discharge switch.

The timing of start-up of the discharge switches 20-1 to 20-$n$ fluctuates. Assuming here that the rectifiers 18-1 to 18-$n$ are omitted, when some or all of the discharge switches are turned on simultaneously, the load will be concentrated to one of the discharge switches 20-1 to 20-$n$ which has been turned on first of all. In the described embodiment, the tendency for the current to rush from other capacitors into the capacitor of the first actuated switch is prevented, by virtue of the provision of the rectifiers 18-1 to 18-$n$. It is assumed here that the discharge switch 20-$i$ has been turned on before all the other switches. In consequence, the discharge takes place only from the capacitor 16-$i$ associated with this switch, so that the voltage of the capacitor 16-$i$ is reduced exponentially, thereby causing a corresponding exponential decrease in the discharge current. Then, as the time elapses, other capacitors of high voltage, which have not discharged yet, commence to discharge, so that the voltage is temporarily raised at the load side with the result that the discharge from the capacitor 16-$i$ is temporarily stopped. The discharge current from this capacitor 16-$i$ starts to flow again as the voltage of the load side is progressively decreased. It is thus possible to reduce the closing/breaking capacity of the discharge switch as compared with the case where there is no rectifier like rectifiers 18-1 to 18-$n$ on the source sides of the respective capacitors.

In the operation of this electrolytic processing apparatus, the charges from the capacitors 16-1 to 16-$n$ are discharged across the gap between the work 12 and the electrode 14 which oppose each other through the electrolyte so as to electrolytically elute the work. In this case, the step of ejecting processing dust is conducted repeatedly after the step for processing the work 12 by electrolytic elution through the discharge of the charges. Thus, the period for discharging the processing dust is longer than the period of electrolytic processing effected by the discharge. It is therefore possible to charge up the capacitors 16-1 to 16-$n$ by means of the charging section 16, by making an efficient use of the period for discharging the processing dust.

It will be understood that the charging current supplied from the power source unit 8 is limited at a level which is necessary for charging up the capacitors 16-1 to 16-$n$, even if the discharge from the capacitors 16-1 to 16-$n$ is effected at a large rate to produce a large discharge current. This conveniently reduces the level of the transient current and, hence, reduces the level of the noise generated at the source side, thereby eliminating any unfavorable effect on the surrounding environment.

Figure 4:
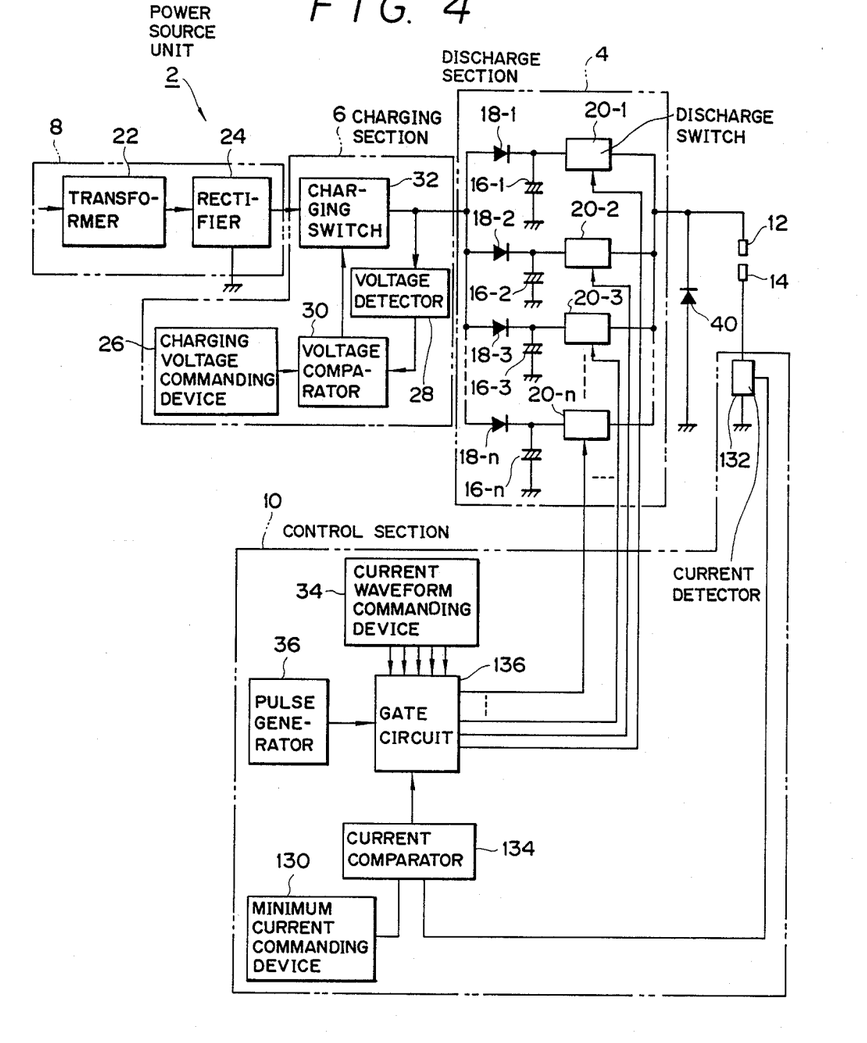
FIGS. 4 and 5 are views respectively similar to FIGS. 1 and 3 but showing a second embodiment which is a modification of the first embodiment.
Figure 5:
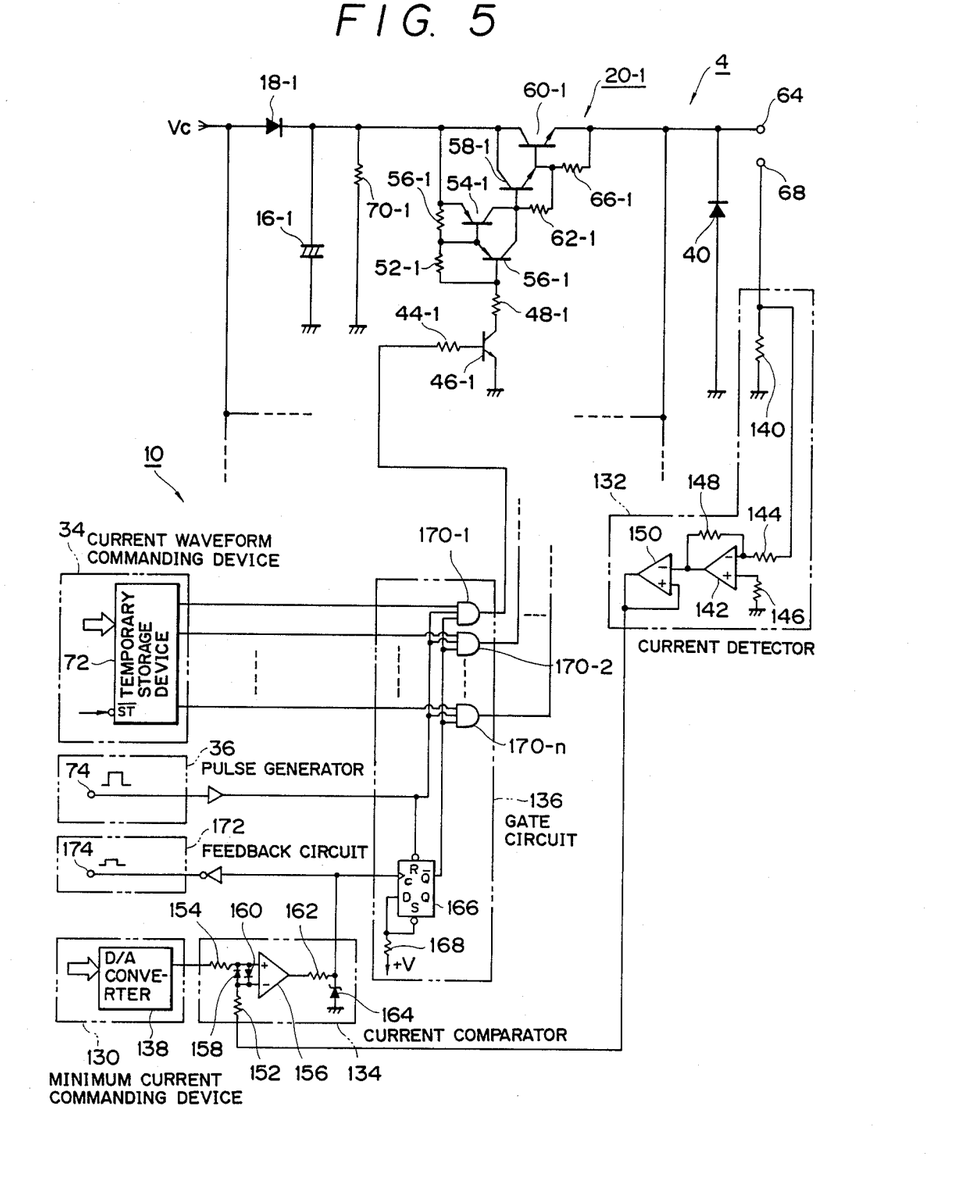
Figure 6:
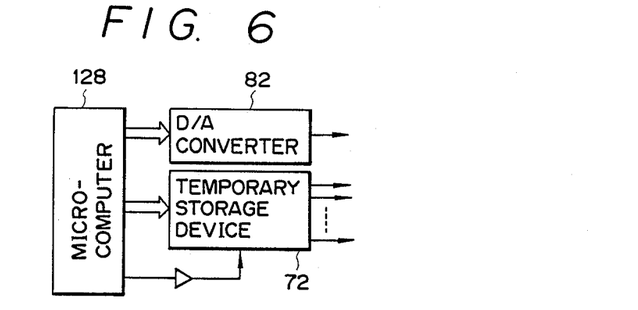
FIG. 6 is a schematic diagram of a power supply system which includes an arithmetic operation unit.

FIGS. 4 and 5 illustrates a modification of the first embodiment.

This modification features the following construction of the control section 10. As in the case of the first embodiment described above the control section 10 has a current waveform commanding device for setting a command waveform of the current discharged across the gap between the work 12 and the electrode 14 which oppose each other through the processing liquid, and a pulse generator 36 for generating discharge pulses of a predetermined pulse width or duration.

In this second embodiment, the control section 10 further has a minimum current commanding device 130 for specifying the smallest value of the discharge current created across the gap between the work 12 and the electrode 14, a discharge current detector 132 for detecting the value of the current of charges discharged across the gap between the work 12 and the electrode 14, and a current comparator 134 for comparing the minimum current value set by the minimum current value commanding device 130 with the discharge current detected by the discharge current detector 132. The control section 10 further has a gate circuit 136 which is adapted to operate upon receipt of the outputs from the current waveform commanding device 34, the pulse generator 36 and the current comparator 134. More specifically, the gate circuit 136 delivers opening/closing driving signals to the discharge switches 20-1 to 20-$n$ so as to allow the charges of the capacitors 16-1 to 16-$n$ to be discharged from the discharge side when the detected current value is above the command current level, and to stop the discharge of the charges from these capacitors 16-1 to 16-$n$ when the detected current value is below the command current value.

Referring to FIG. 5, the minimum current commanding device 130 is adapted to output the set minimum current after D/A conversion by a D/A converter 138. The discharge current detector 132 is provided with a resistor 140 connected to the grounding side of the electrode terminal 68. The end of the resistor 140 adjacent to the electrode terminal 68 is connected to one of the inputs of the amplifier 142 through a resistor 144. The other input of the amplifier 142 is grounded through a resistor 146. The output of the amplifier 142 is connected through a resistor 148 to the one of its inputs which is connected to the resistor 144. The output also is connected to one of the inputs of the amplifier 150. The amplifier 150 has an output which is connected to the other input thereof, and detects and outputs the discharge current formed by the charges discharged.

The output of the D/A converter 138 of the minimum current commanding device 130 and the output of the amplifier 150 of the discharge current detector 132 are connected to the inputs of a comparator 156 of the current comparator 134, through resistors 152 and 154, respectively. Rectifiers 158 and 160 are connected between the respective resistors 152, 154 and the comparator 156. To the output of the comparator 156 is connected a resistor 162 which is connected to a voltage regulator 164 which is grounded at its one end. The output also is connected to the clock terminal of the D-type flip-flop 166 of the gate circuit 136.

Figure 8A:
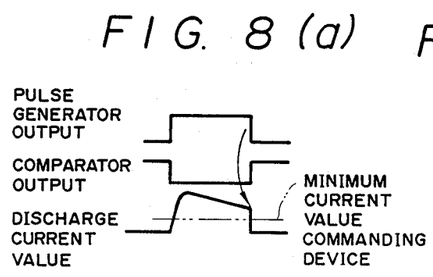
FIGS. 8(a) and 8(b) are waveform charts showing the relationship between the output of a pulse generator and the discharge current.
Figure 8B:
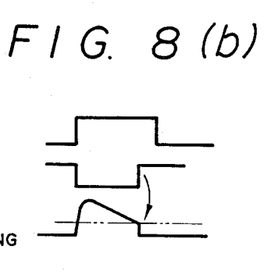

The data input and set input of the flip-flop 166 of the gate circuit 136 are pulled up by the power supply through the resistor 168. The reset input is connected to the output terminal 74 of the pulse generator 36. The gate circuit 136 has AND gates 170-1 to 170-$n$ to which are connected respective outputs of the temporary storage device 72 of the electric current waveform commanding device 34, the output of the pulse generator 36, and the output of the flip-flop 166. The AND gates 170-1 to 170-$n$ are adapted to actuate the discharge switches 20-1 to 20-$n$ so as to open and close the same, to thereby control the discharge of the capacitors in accordance with the signals derived from the temporary storage device 72 of the waveform commanding device 34, the output of the pulse generator 36, and the flip-flop 166. More specifically, when as in FIG. 8($a$) the electric current detected by the discharge current detector 132 is higher than the minimum current value set by the minimum current commanding device 130, the transistors 46-1 to 46-$n$ of the discharge switches 20-1 to 20-$n$ are selectively turned on so as to discharge the charges from the capacitors 16-1 to 16-$n$, thereby enabling the capacitors 16-1 to 16-$n$ to discharge. Conversely, when the current value detected by the discharge current detector 132 is below the level of the current set by the minimum current commanding device 130 as shown in FIG. 8($b$), the transistors 46-1 to 46-$n$ of the discharge switches 20-1 to 20-$n$ are turned off so as to stop the discharge from the capacitors 16-1 to 16-$n$.

Therefore, in luster finishing of the processed surface by, for example, an electrolytic processing apparatus, the discharge of the charges is stopped when the value of the discharge current has come down below the necessary minimum current value, so that the rate of discharge of the charges can be maintained above a predetermined level. This in turn eliminates the necessity for the discharge current to be set with a large margin. It is therefore possible to obviate problems of the prior art such as the excessively large current density which would occur at the peak when the charging voltage is set high, and prolonged processing time due to employment of the increased number of discharge cycles required when the duration of each discharge cycle is determined to be short. The processing time can be detected by inputting and accumulating the pulse widths generated by the pulse generator 36 to the input terminal 174 of the feedback circuit 172, as shown in FIG. 5. With this feedback circuit 172, it is possible to detect any abnormality taking place during processing, by comparing the pulse width of the pulse output from the pulse generator 36 and that of the input pulse.

Figure 10:
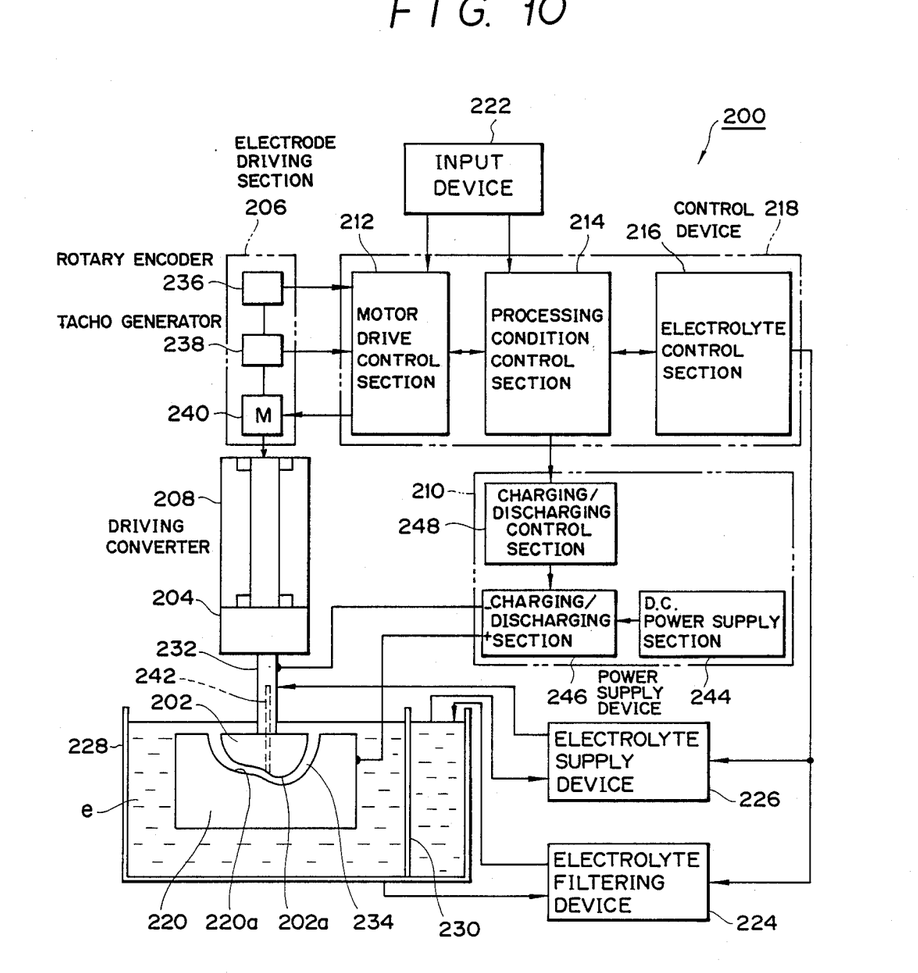
FIG. 10 is a schematic diagram of an electrolytic processing apparatus which includes a further embodiment of the present invention.

FIGS. 10 to 15 illustrate a second embodiment of the present invention. Referring to FIG. 10, the electrolytic processing apparatus 200 has the following parts: an electrode fixing or supporting device 204 to which the electrode 202 is fixed; a driving converter 208 for converting the rotational movement of an electrode driving section 206 into reciprocatory movement: a power supply device 210 for generating pulse current; a control device 218 composed of a motor drive control section 212, a processing condition control section 214 and an electrolyte control section 216; an input device 222 for inputting data concerning the work 222; an electrolyte filtering device 224; an electrolyte supplying device 226; a processing cell 228; and an electrolyte reservoir 230 provided with the processing cell 228.

The electrode fixing device 204 has a rod 232, to the lower end of which is connected an electrode 202 consisting of, for example, a pure copper, the electrode 202 being used in the discharge processing of the work 220 and having an electrode surface 202a which opposes the processed surface 220a of the work 220 with a uniform gap 234 in all three-dimensional directions. The electrode fixing device 204 is movable up and down, in such a manner as to maintain a constant value of the gap 234, by the electrode driving section 206 through the driving converter 208. More specifically, a rotary encoder 236 and a tacho generator 238 of the electrode driving section 206 produce signals which are delivered to the control device 218 so that a control signal is output from the motor driving control section 212 of the controller 218 so as to rotatingly control the motor 240. The rotational movement produced by the motor 240 is converted into a reciprocatory motion by means of the driving converter portion 208, so that the electrode fixing device 208 is moved up and down to maintain the constant gap 234 between the electrode surface 202a and the work surface 220a.

The input device 222 is adapted to input signals representing data such as the material and the surface area of the work 220, finish margin, the grade of the dimensional precision, surface roughness and the processing electrode gap, and delivers these signals to the motor driving control section 212 and the processing condition control section 214 of the control device 218.

The electrolyte filtering device 224 and the electrolyte supplying device 226 filter the electrolyte containing electrolytic products produced during the processing. The filtered electrolyte is jetted in accordance with the control signal from the electrolyte control section 216 through a supply port 242 formed in the rod 232 into the gap 234 at a constant liquid pressure, thereby removing the electrolytic products generated between the work surface 220a and the electrode surface 202a during the processing.

Figure 11:
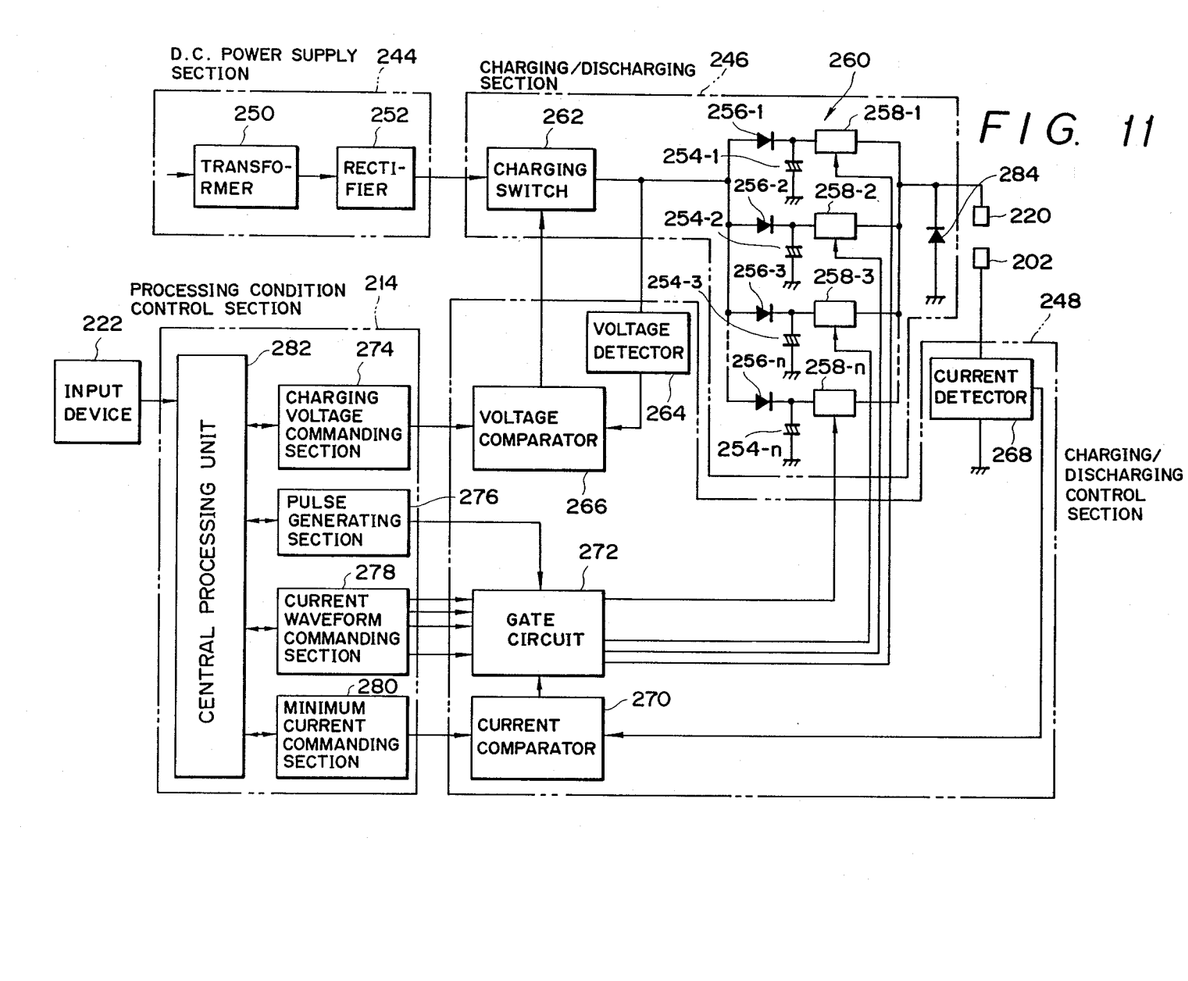
FIG. 11 is a schematic block diagram of a power supply system which is part of the apparatus of FIG. 10 and embodies the present invention.

The power supply system 210 is adapted to supply a pulse current of a current density (current value per unit area) of 70 A/cm$^2$ or less across the gap between the work 220 and the electrode 202. More specifically, the power supply system 210 is adapted for producing a pulse current of a predetermined density computed in accordance with the surface area of the work, in accordance with the control signal from the processing condition control section 214. The power supply unit 210 has a D.C. power supply portion 244 (FIG. 1), charging/discharging section 246 and a charging/discharging control section 248. An example of the construction of the power supply system 210 is shown in FIGS. 11 and 12.

Figure 12:
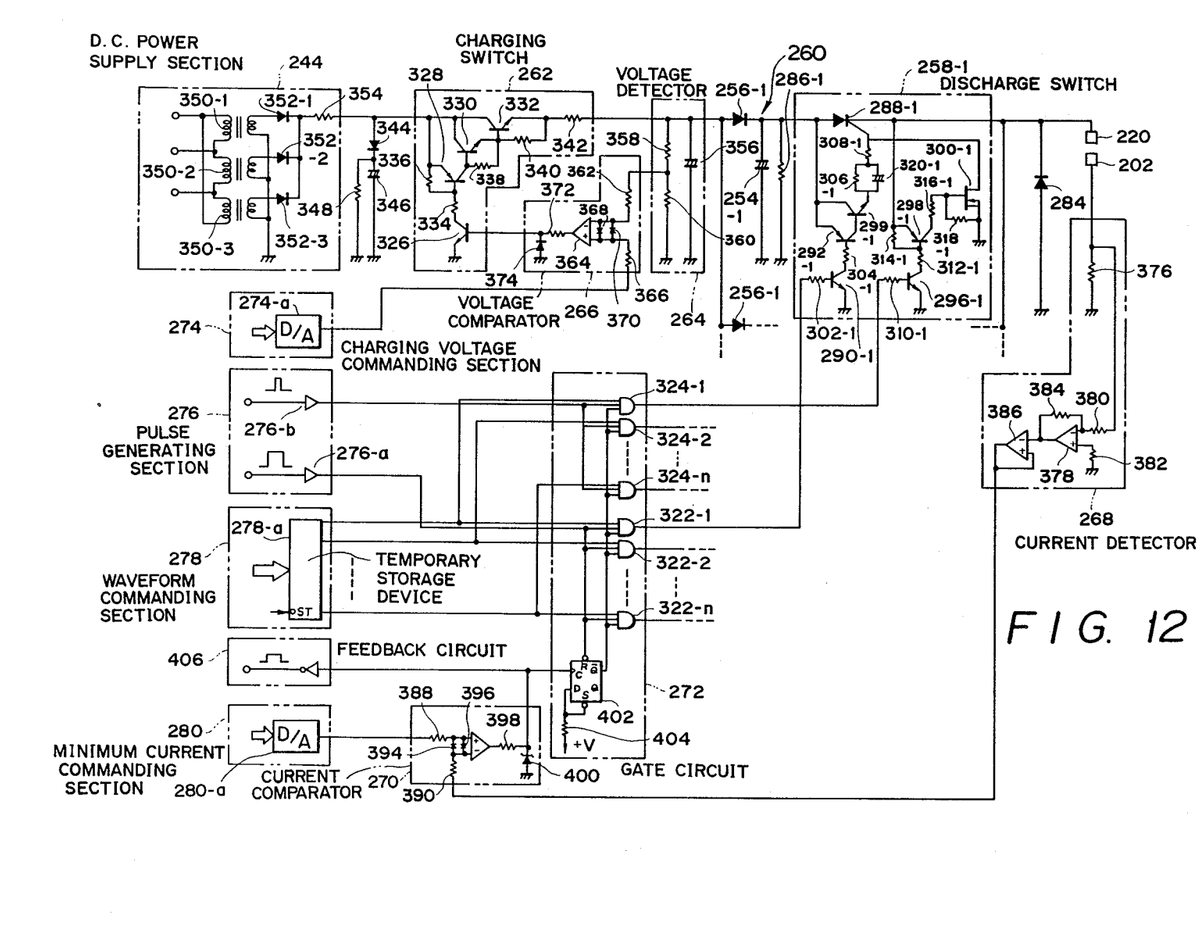
FIG. 12 is a schematic circuit diagram of the power supply system of FIG. 11.
Figure 13:
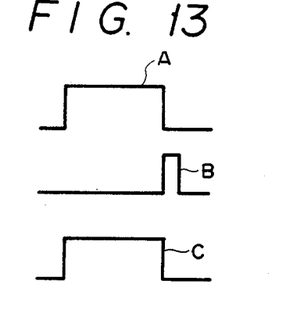
FIG. 13 is a waveform chart illustrating the operation of a discharge switch which is part of the circuit of FIG. 12.

Referring now to FIG. 12, the D.C. power supply portion 244 has a transformer 350 and a rectifier 352. An A.C. current of a voltage reduced by the transformer 350 is supplied to the rectifier 352 which produces a D.C. current delivered to later-mentioned capacitors 254-1 to 254-$n$.

The charging/discharging section 246 includes a discharge section 260 composed of the capacitors 254-1 to 254-$n$ adapted for causing electric discharge across the gap between the work 220 and the electrode 202, diodes 256-1 to 256-$n$ connected to the capacitors 254-1 to 254-$n$ and adapted for preventing the reversing of the charge to the D.C. power source section 244, and discharge switches 258-1 to 258-$n$ adapted to be turned on and off to selectively allow the charge from the capacitors 254-1 to 254-$n$ to discharge. The charging/discharging section 246 also includes a charging switch 262 which is adapted to selectively cut-off the supply of the electric current from the D.C. power supply unit 244 so as to charge the capacitors 254-1 to 254-$n$ to a desired level. More specifically, in the discharge section 260, the capacitors 254-1 to 254-$n$, diodes 256-1 to 256-$n$ and the discharge switches 258-1 to 258-$n$ are connected in parallel, so that the discharge switches 258-1 to 258-$n$ are turned on and off in accordance with control signals from a later-mentioned charging/discharging control section 248 (FIG. 1).

The charging/discharging control section 248 includes the following parts: a voltage detector 264 for detecting the charging voltage supplied to the capacitors 254-1 to 254-$n$; a voltage comparator 266 adapted to compare the command charging voltage set by the charging voltage commanding section 274 of the processing condition control section 214 and the charging voltage detected by the voltage detector 264; a current detector 268 for detecting the current resulting from the discharged charges; a current comparator 270 for comparing the minimum current value set by the minimum current commanding section 280 of the processing condition control section 214 and the current value detected by the current detector 268; and a gate circuit 272 adapted for delivering opening/closing driving signals to the discharge switches 258-1 to 258-$n$, in accordance with the inputs from the pulse generating section 276 and current waveform commanding section 278 of the processing condition control section 214 and the input from the current comparator 270, in such a manner as to allow the charges from the capacitors 254-1 to 254-n to be discharged when the detected current value is greater than the minimum current, and to stop the discharge from the capacitors 254-1 to 254-n when the detected current is below the minimum current.

Referring to FIG. 11, a reference numeral 282 denotes a central processing unit (CPU) adapted to compute and process processing conditions in accordance with the data input through the input device 222, while a numeral 284 designates a diode which prevents the discharge switches from being broken down by the back electromotive force which is generated when each of the discharge switches 258-1 to 258-n is turned on.

FIG. 12 is a schematic circuit diagram of the arrangement shown in FIG. 11. The following description will proceed with reference to this Figure. The charging-/discharging section has diodes 256-1 to 256-n for preventing backward current flow at the source side of the respective capacitors 254-1 to 254-n, and the discharge switches 258-1 to 258-n connected to the discharge side of these diodes. The charging/discharging section also has resistors 286-1 to 286-n connected in parallel with the capacitors 254-1 to 254-n. All the discharge switches 258-1 to 258-n have an identical construction, so that only the discharge switch 258-1 will be described by way of example.

The discharge switch 258-1 has a GTO (gate turn-off) thyristor 288-1, five transistors 290-1 to 298-1, an FET (field-effect transistor) 300-1, nine resistors 302-1 to 318-1, and a capacitor 320-1. In operation, the transistors 290-1 to 298-1 are successively turned on in accordance with the signal from the AND gate 322-1 of the gate circuit 272 of the charging/discharging control section 248, thereby turning the GTO thyristor 288-1 on, thus allowing the capacitor 254-1 to discharge. At the same time, the transistors 1901-1 to 298-1 and the FET 300-1 are turned on in accordance with the signal from the AND gate 324-1 of the gate circuit 272, thereby turning the GTO thyristor 288-1 off whereby the discharge from the capacitor 254-1 is stopped. More specifically, referring to FIG. 13, when a signal A is received by the base of the transistor 290-1 while a signal B is received by the base of the transistor 296-1, the discharge switch 258-1 outputs a signal C shown in this Figure.

The charging switch 262 has four transistors 326 to 332 and five resistors 334 to 342. The command charging voltage output from the D/A converter 274-a of the charging voltage commanding section 274 and the charging voltage detected by the voltage detector 264 are compared with each other by a voltage comparator 266. The transistors 326 to 332 are selectively turned on and off by the output of this voltage comparator 266 so as to turn on and off the power from the D.C. power source unit 244 thereby to charge the capacitors 254-1 to 254-n to predetermined level. In order to protect the charging switch 262, a diode 344, a capacitor 346 and a resistor 348 are connected as illustrated in FIG. 12 between the D.C. power source unit 244 and the charging switch 262.

In the D.C. power supply unit 244, each phase of an input A.C. power is transformed into a lower voltage by each coil 350-1 to 352-n, and the power of the reduced voltage is rectified by the diodes 352-1 to 352-n. The D.C. current obtained as a result of rectification is output through the resistor 354.

The voltage detector 264 of the charging/discharging control section 248 has a capacitor 356 which is grounded at one side, and two series connected resistors 358 and 360 are connected in parallel across the capacitor 356, and outputs a voltage formed as a result of voltage division by these resistors 358 and 360. The output of the voltage detector 264 is connected to one input of the comparator 364 of the voltage comparator 266 through a resistor 362. The other input of the comparator 364 is connected through a resistor 366 to the output of the charging voltage commanding section 274 of the processing condition control section 214. Diodes 368 and 370 are connected between the inputs of the comparator 364. To the output of the comparator 364 is connected a resistor 372 which is connected at its opposite end to one end of a diode 374 which is grounded at its one end. The resistor 372 is also connected to the base of a transistor 326 of the charging switch 264.

The current detector 268 has a resistor 376 connected between ground and the electrode 202. The end of the resistor 376 adjacent to the electrode 202 is connected through a resistor 380 to one of the inputs of an amplifier 378, while the other input of an amplifier 378 is grounded through the resistor 382. The output of the amplifier 378 is connected through a resistor 384 to its input connected to the resistor 380, and also is connected to one of the inputs of an amplifier 386. The amplifier 386 has its output connected to its other input, so that it detects and outputs the value of the discharge current formed by the discharged charges. The output of the D/A converter 280-a of the minimum current commanding section 280 of the processing condition control section 214, and the output of the amplifier 386 of the current detector 268, are connected to respective inputs of the comparator 392 of the current comparator 270 through respective resistors 388 and 390. Diodes 394 and 396 are connected between the inputs of the comparator 392. To the output of the comparator 392 is connected a resistor 398 which is connected at its other end to one end of a constant voltage diode 400 which is grounded at its other end. The resistor 398 also is connected to the clock terminal of a D-type flip-flop (FF) of the gate circuit 272.

The data and set input of the FF 402 of the gate circuit 272 are pulled-up by the power supply through the resistor 404, while the reset input thereof is connected to the output terminal of the pulse generating section 276.

The gate circuit 272 has two groups of AND gates 322-1 to 322-n and 324-1 to 324-n. To the inputs of the AND gates 322-1 to 322-n and 324-1 to 324-n are connected outputs of the temporary storage device 278-a of the waveform commanding section 278, outputs of the pulse generators 276-a and 276-b of the pulse generating section 276 and the output of the FF 402. The AND gates 322-1 to 322-n and 324-1 to 324-n are adapted for effecting opening/closing driving of the discharge switches 258-1 to 258-n upon receipt of signals from the temporary storage device 278-a, the pulse generators 276-a and 276-b, and the FF 402. Namely, when the current value detected by the current detector 268 is greater than the minimum current value set by the minimum current commanding section 280, the AND gates 322-1 to 322-n deliver ON signals to some or all of the transistors 290-1 to 290-n of the discharge switches 258-1 to 258-n so as to turn on the GTO thyristors 288-1 to 288-n, thereby causing some or all of the capacitors 254-1 to 254-n to discharge. Conversely, when the discharge current detected by the discharge current detector 268 is below the minimum current set by the minimum current commanding section 280, the AND gates 324-1 to 324-n provide ON signals to turn on the transistors 296l to 296-n of the discharge switches 258-1 to 258-n, thereby turning off the GTO thyristors 288-1 to 288-n, whereby discharging of the capacitors 254-1 to 254-n stops.

In FIG. 12, reference numeral 406 designates a feedback circuit which is adapted for comparing the pulse width of the pulses output from the pulse generator 276-a with that of the input pulses, thereby detecting any abnormality of the processing.

Figure 14:
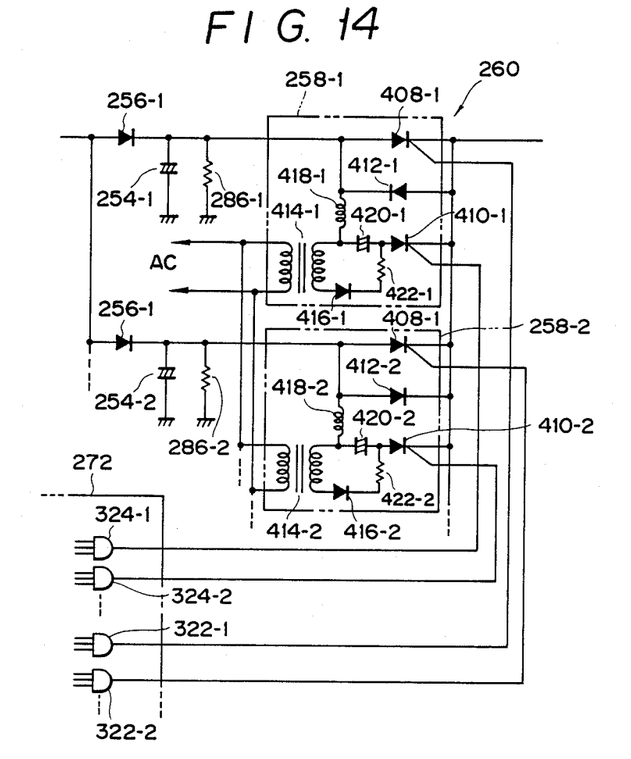
FIG. 14 is a schematic diagram of an alternative embodiment of a discharge switch shown in FIG. 12.

FIG. 14 shows another example of the discharge switches 258-1 to 258-n. The construction of the discharge switch 258-1 will be described by way of example. The discharge switch 258-1 includes a pair of thyristors 408-1 and 410-1, a diode 412-1 connected in parallel With the thyristor 408-1, a transformer 414-1, a diode 416-1 and coil 418-1 connected to respective terminals on the output side of the transformer 414-1, a capacitor 420-1, and a resistor 422-1. The output of the AND gate 322-1 of the gate circuit 272 is connected to the gate of the thyristor 408-1, while the output of the AND gate 324-1 is connected to the gate of the thyristor 410-1.

Figure 15:
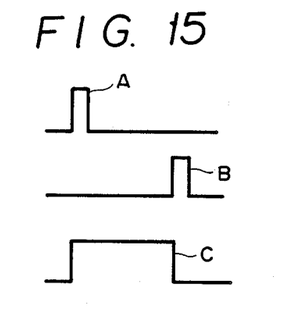
FIG. 15 is a waveform chart illustrating the operation of the discharge switch shown in FIG. 14.

FIG. 15 is an illustration of the operation of this modified discharge switch 258-1. As will be clearly understood from this Figure, the discharge switches 258-1 to 258-n of FIG. 14 produce the same effect as that produced by the discharge switches 258-1 to 258-n of FIGS. 11 and 12.

The operation of the electrolytic processing apparatus 200 of FIGS. 10–12 will be described with reference to a finish processing method.

For the purpose of conducting the finish processing, a work 220 formed into a desired shape, for example by an electric discharging process, is fixed to a work fixing or supporting device, which is not shown. At the same time, the same electrode 202 used in the electric discharging process is fixed to the lower end of the rod 232 of the electrode fixing device 204. The electrode 202 is then lowered to bring its surface 202a to a position where it faces the surface 220a of the work 220 to be processed. The electrode 202 and the work 220 thus opposing each other are immersed in an electrolyte e contained in the processing cell 228. This position of the electrode 202 is stored as an origin A, and the electrode 202 is raised to a position where a discharge gap of desired dimension is attained, the desired dimension having been input through the input device and stored in the CPU. When the gap between the surface 220a to be processed and the electrode surface 202a is filled with the electrolyte e the processing is commenced from this position.

In a beginning portion of the finish processing, the power supply system 210 delivers, in accordance with a control signal from the processing condition control section 214, pulses of a predetermined current density (for example 17 A/cm$^2$) between the work 220 and the electrode 202 for the purpose of improving the fineness of the work surface. More specifically, the controller 218 turns on some or all of the AND gates 322-1 to 322-n of the gate circuit 272 so as to turn on the corresponding discharge switches 258-1 to 258-n, thereby effecting discharges from the corresponding capacitors 254-1 to 254-n which have been charged up with reduced current in a comparatively long charging time.

As a result, the material of the work 202 is removed from the surface 220a so that, after supplying pulses one or more times, the stationary electrolyte in the gap 234 containing electrolytic products is forcibly removed by the electrolyte which is jetted by the electrolyte supplying device 225 through the supply port 242.

After the electrolytic products are removed, the electrode 202 is lowered so that the electrode surface 202a is brought into contact with the surface 220a. Then, the instant position of the electrode is compared with the above-mentioned origin A by the controller 218 so as to measure the processing depth corresponding to one processing cycle (processing by a single pulse or several pulses). Subsequently, the electrode 202 is raised again so as to recover the predetermined gap 234 between the surface of the work piece 220a and the electrode surface 202a, and the gap between the work surface 220a and the electrode surface 202a is filled with the electrolyte e which is the mixture of the electrolyte jetted from the processing cell 228 and the old electrolyte. When the electrode 202 has reached the predetermined position where the predetermined gap 234 is formed between the electrode surface 202a and the processed surface 220a, the electrolyte e is made stationary, that is, the flow of the electrolyte e is stopped and made still. Then, 1 to 5 seconds thereafter, pulses are supplied in order to commence the next processing cycle.

The described finish processing is repeated several times in accordance with the instructions given by the controller 218, and the accumulated values of the processing depth are compared with the command value of the processing depth which has been computed by the processing condition control section 214 in accordance with the input data from the input device 222. When the difference between the accumulated value of the processing depth and the command processing depth drops down below a predetermined value, for example 1 μm, the mode of the pulse supplied from the power supply system 210 is switched to a luster pulse mode of a current density which is greater than 3/2 that of the pulse supplied during the beginning period of the finish processing, for example 40 A/cm$^2$. A predetermined number of processing cycles are conducted with this current density, thus completing the finish processing.

When the discharge current value has come down below the minimum current value set in the minimum current commanding device 280, the control device 218 and the charging/discharging control section 248 provide control signals so as to turn on and off some or all of the AND gates 324-1 to 324-n of the gate circuit 272, thereby turning off the corresponding discharge switches 258-1 to 258-n so as to stop the current discharge from the corresponding capacitors 254-1 to 254-n.

Thus, in this second embodiment, some or all of the parallel discharge switches 258-1 to 258-n are selectively turned on and off in accordance with the control signals from the controller 218 and the charging/discharging control section 248. When the required current density is comparatively small, as is the case for the finish processing, ten discharge switches, for example discharge switches 258-1 to 258-10, are turned on. When the discharge current has come down below the minimum value during this processing, the ten discharge switches 258-1 to 258-10 are turned off so as to stop the discharge from the capacitors 254-1 to 254-10. It is thus possible to control the number of capacitors 254-1 to 254-n which are taking part in the processing, in accordance with the current density of the pulses to be employed.

The discharge switches 258-1 to 258-*n* are turned off immediately after the supply of pulses to the gap between the work 220 and the electrode 202 ceases. This means that the charges accumulated in the capacitors 254-1 to 254-*n* are not completely discharged. For instance, when the finish processing is conducted by changing the pulse mode from the low current density mode to the high current density mode, the time required for the switching, including the time required for charging up the capacitors, can be shortened. Furthermore, the use of thyristors 288-1 to 288-*n* permits the control of a large electric current, so that the power supply system of the invention can be used in finish processing conducted in a stationary electrolyte.

The described construction for turning on and off the discharge switch 258-1 to 258-*n* is only illustrative. For instance, it is possible to provide the processing condition control section 214 and the charging/discharging section 248 as a common section, or to employ an OR gate as the gate circuit 272.

As will be understood from the foregoing description of the first form of the present invention, the discharge switches are controlled by the control section in such a manner that, for example, a plurality of capacitors are selectively allowed to discharge and the discharge from the capacitors can be stopped when a predetermined condition is met, for example when the discharge current has come down below the minimum electric current. In addition, the value of the charging current for charging up the capacitors is limited to a value necessary for charging up these capacitors, even when the amount of charge required from each capacitor (the discharge current) is increased, so that noise generated in the power supply side can be diminished.

In the second form of the present invention, there is a power supply system for an electrolytic processing apparatus of the type in which an electrode is positioned to oppose a work within an electrolyte, such that the work is processed and finished by discharge of pulses between the work and the electrode, and the power supply system includes a discharge section having capacitors capable of discharging charges across the work and the electrode, having rectifiers connected to the capacitors and adapted for preventing reversing of charges to the power source side, and having a plurality of parallel discharge switches having an on-off function and connected to the capacitors; and includes a control section for turning the discharge switches on and off so as to control the discharge of charges from the capacitors.

With this arrangement, it is possible to suitably control the number of the capacitors to be used, in accordance with the current densities of the pulses to be supplied. In addition, the charges in the capacitors can be discharged efficiently. It is also possible to supply pulses in large current densities so as to process a three-dimensional work surface in a short time and with a high precision into a mirror-finished surface.

The embodiments of the invention in which an exclusive property or privilege is claimed are defined as follows:

1. A power supply system for an electrolytic processing apparatus of the type having an electrode positioned to oppose a work within an electrolyte so that the work is electrolytically processed and finished by a discharge of pulses between the work and the electrode, said power supply system comprising: a discharge section having a plurality of capacitors and discharge means for discharging charges from the capacitors to the gap between the work and the electrode which face each other across the electrolyte; rectifiers connected to said capacitors so as to prevent reversing of current to a power supply side, said discharge means including a plurality of discharge switches each connected to a respective one of said capacitors and adapted to be turned on and off so as to selectively enable said capacitors to discharge said charges; a power supply section which supplies a predetermined electric power for said capacitors; charging section means for selectively transferring power from said power supply section to each said capacitor as a function of the voltage on such capacitor; and control section means for simultaneously turning on and then simultaneously turning off a subset of said discharge switches to thereby control the discharge of charges from a corresponding subset of said capacitors, said control section means having means for selecting the number of said discharge switches in said subset from a range bounded inclusively by a value of 1 and a value equal to the number of said capacitors in said plurality thereof.

2. A power supply system according to claim 1, wherein said power supply section includes a transformer and a rectifier, and supplies a D.C. voltage to said capacitors through said charging section means.

3. A power supply system according to claim 1, wherein said charging section means includes charging voltage commanding means for setting a command charging voltage for charging said capacitors, voltage detector means for detecting the voltage supplied to said capacitors, voltage comparator means for comparing the command charging voltage set by said charging voltage commanding means to the charging voltage detected by said voltage detector means, and charging switch means operative in accordance with the output from said comparator means for selectively allowing the power of said power supply section to be supplied to said capacitors so as to charge up said capacitors.

4. A power supply system according to claim 1, wherein said control section means includes current waveform commanding means for producing a command defining a waveform of the charges to be discharged across the gap between the work and the electrode which face each other across the electrolyte, pulse generator means for generating a pulse having a pulse width corresponding to the desired width of a charge discharging pulse, and gate circuit means operative in response to the command from said current waveform commanding means and said pulse from said pulse generator means for delivering turn on and turn off driving signals to said discharge switches so as to enable charges from said capacitors to be discharged in said waveform.

5. A power supply system according to claim 1, wherein said control section means includes current waveform commanding means for producing a command defining a waveform to be discharged in the gap between the work and the electrode which oppose each other across the electrolyte, pulse generator means for generating a pulse having a pulse width corresponding to the desired width of a charge discharging pulse, minimum current commanding means for producing a command defining the minimum discharge current to be formed by said charges discharged in the gap between the work and the electrode which oppose each other across the electrolyte, discharge current detector means for detecting the actual discharge current produced by the charges discharged in the gap between the work and the electrode, current comparator means for comparing said command defining the minimum discharge current to the discharge current detected by said discharge current detector means, and gate circuit means operative in response to inputs from said current waveform commanding means, said pulse generator means and said current comparator means for delivering turn on and turn off driving signals to said discharge switches to cause said capacitors to discharge to produce said waveform when the detected discharge current is greater than said minimum discharge current, and to stop the discharge of said capacitors when the detected discharge current is below said minimum discharge current.

6. A power supply system according to claim 5, wherein said charging section means includes charging voltage commanding means for setting a command charging voltage for charging said capacitors, and wherein said charging voltage commanding means, said current waveform commanding means and said pulse generator means are implemented in the form of a single arithmetic processing unit.

7. A power supply system according to claim 1, wherein each said discharge switch includes a gate turn off thyristor.

8. A power supply system according to claim 1, wherein each said discharge switch includes a pair of thyristors.

9. A power supply system for an electrolytic processing apparatus which has a spaced work and electrode disposed in an electrolyte and which electrolytically machines the work by discharging pulses between the work and electrode, comprising: a plurality of capacitors; charging means for storing an electric charge on each of said capacitors, said charging means selectively providing charge to each said capacitor as a function of the voltage on such capacitor; rectifier means provided between each said capacitor and said charging means for preventing a reverse flow of current from the capacitor to said charging means; a plurality of electronic discharge switches which can each be turned on and turned off to respectively effect and interrupt an electrical connection between a respective said capacitor and the work and electrode; and control means for simultaneously turning on and then simultaneously turning off a subset of said discharge switches to control the transfer of electric charges from said capacitors to the work and electrode, said control means having means for selecting the number of said discharge switches in said subset from a range bounded inclusively by a value of 1 and a value equal to the number of said capacitors in said plurality thereof.

10. An electrolytic processing apparatus, comprising: a workpiece; an electrode; current supplying means for causing current to flow between said electrode and said workpiece, including a predetermined number of selectively actuable circuits which are each operatively coupled to said workpiece and said electrode and which each, when actuated, cause a respective amount of current to flow between said electrode and said workpiece; and control means for selectively actuating said selectively actuable circuits, said control means including means for simultaneously actuating a subset of said selectively actuable circuits, the number of said circuits in said subset being greater than one and less than said predetermined number.

11. An apparatus according to claim 10, wherein said control means includes means for simultaneously actuating all of said selectively actuable circuits, and includes means for actuating only a selected one of said selectively actuable circuits during a given time interval.

12. An apparatus according to claim 10, wherein said current supplying means includes a source of electric charge, wherein said selectively actuable circuits each include charge storage means, means for supplying electric charge from said charge source to said charge storage means, and switching means responsive to said control means for selectively connecting said charge storage means to said workpiece and said electrode.

13. An apparatus according to claim 12, wherein each said means for supplying electric charge includes means for preventing a flow of electric charge from the associated charge storage means to said charge source.

14. An apparatus according to claim 13, wherein said workpiece is connected to ground, wherein each said charge storage means includes a capacitor having a first end connected to ground and a second end connected through the associated switching means to said electrode, wherein each said means for supplying electric charge includes a diode having its cathode connected to said second end of the associated capacitor and having its anode connected to said charge source, and including a diode having its cathode connected to said electrode and its anode connected to ground.

15. An apparatus according to claim 12, wherein said charge source includes: a selectively actuable charge switch having an input connected to a power source and an output connected to each said selectively actuable circuitry; a voltage detector which detects the voltage at the output of said charge switch, and comparator means for comparing said detected voltage to a reference voltage value and for controlling actuation of said charge switch as a function of said comparison.

16. An apparatus according to claim 10, wherein said control means includes waveform commanding means for defining a current waveform for the current flowing between said electrode and workpiece, said waveform commanding means including a central processing unit having a plurality of outputs, and a plurality of AND gates each having a first input coupled to a respective one of said plurality of outputs of said central processing unit, having a second input, and having an output coupled to a control input of a respective one of said selectively actuable circuits, said second inputs of said AND gates all being connected to an output of a pulse generator, said waveform commanding means being operable to define said subset of said selectively actuable circuits.

17. An apparatus according to claim 10, wherein said control means includes current monitor means for monitoring a current flowing between said electrode and said workpiece, said current monitor means being operable to inhibit actuation of all of said selectively actuable circuits when said current flowing between said electrode and said workpiece is below a minimum current value.

* * * * *